US011032060B2

(12) United States Patent
Tunstall

(10) Patent No.: US 11,032,060 B2
(45) Date of Patent: *Jun. 8, 2021

(54) EXPONENT SPLITTING FOR CRYPTOGRAPHIC OPERATIONS

(71) Applicant: Cryptography Research, Inc., Sunnyvale, CA (US)

(72) Inventor: Michael Tunstall, Walnut Creek, CA (US)

(73) Assignee: Cryptography Research, Inc., San Jose, CA (US)

( * ) Notice: Subject to any disclaimer, the term of this patent is extended or adjusted under 35 U.S.C. 154(b) by 5 days.

This patent is subject to a terminal disclaimer.

(21) Appl. No.: 16/534,719

(22) Filed: Aug. 7, 2019

(65) Prior Publication Data

US 2020/0076569 A1 Mar. 5, 2020

Related U.S. Application Data

(63) Continuation of application No. 15/516,662, filed as application No. PCT/US2015/052325 on Sep. 25, 2015, now Pat. No. 10,389,520.

(60) Provisional application No. 62/059,477, filed on Oct. 3, 2014.

(51) Int. Cl.
    *H04L 9/00* (2006.01)
    *G06F 7/72* (2006.01)
    *G06F 21/75* (2013.01)

(52) U.S. Cl.
    CPC .............. *H04L 9/003* (2013.01); *G06F 7/723* (2013.01); *G06F 21/755* (2017.08); *G06F 2207/7242* (2013.01)

(58) Field of Classification Search
    CPC ....... H04L 9/003; G06F 21/755; G06F 7/723; G06F 2207/7242
    USPC ......................................................... 713/187
    See application file for complete search history.

(56) References Cited

U.S. PATENT DOCUMENTS

| 5,675,649 | A | * | 10/1997 | Brennan | ............... | H04L 9/0894 380/286 |
|---|---|---|---|---|---|---|
| 5,987,131 | A |   | 11/1999 | Clapp |   |   |
| 7,536,011 | B2 |   | 5/2009 | Takenaka et al. |   |   |
| 8,243,920 | B2 |   | 8/2012 | Golic |   |   |

(Continued)

FOREIGN PATENT DOCUMENTS

| EP | 1691501 A1 | 8/2006 |
|---|---|---|
| EP | 1648111 B1 | 1/2014 |
| TW | 200822665 A | 5/2008 |

OTHER PUBLICATIONS

CN Office Action dated Feb. 3, 2020 re: CN Appln. No. 201580050978.1. 18 Pages. (With Translation).

(Continued)

*Primary Examiner* — Michael S McNally
(74) *Attorney, Agent, or Firm* — Lowenstein Sandler LLP

(57) ABSTRACT

A first share value and a second share value may be received. A combination of the first share value and the second share value may correspond to an exponent value. The value of a first register is updated using a first equation that is based on the first and second share values and the value of a second register is updated using a second equation that is based on the second share value. One of the value of the first register or the value of the second register is selected based on a bit value of the second share value.

20 Claims, 6 Drawing Sheets

(56) References Cited

U.S. PATENT DOCUMENTS

| | | | |
|---|---|---|---|
| 8,369,514 | B2 | 2/2013 | Braun et al. |
| 8,422,671 | B2 | 4/2013 | Yoon et al. |
| 8,638,927 | B2 | 1/2014 | Takenaka et al. |
| 8,670,557 | B2 | 3/2014 | Trichina et al. |
| 2012/0207298 | A1 | 8/2012 | Meyer |

OTHER PUBLICATIONS

He, Yiruo, "Highly Secure Cryptographic Computations Against Side-Channel Attacks", (2013), Electronic Theses and Dissertations, 4717, University of Windsor Scholarship at UWindsor, 11 Pages, https://scholar.uwindsor.ca/etd/4717.

Chevallier-Mames, Benoit, "Self-Randomized Exponentiation Algorithms", published in T. Okamoto Eds., Topics in Cryptology—CT-RSA 2004, pp. 1-14. 14 pages.

Gandolfi-Villegas, Karine et al., "Dynamic Runtime Methods to Enhance Private Key Blinding", IACR Cryptology ePrint Archive, vol. 2013/447, pp. 1-15, received Jul. 16, 2013. 15 pages.

He, Yiruo, "Highly Secure Cryptographic Computations Against Side-Channel Attacks", (2013), Electronic Theses and Dissertations, 4717, University of Windsor Scholarship at UWindsor, 99 Pages, https://scholar.uwindsor.ca/etd/4717.

He, Yiruo, "Highly Secure Cryptographic Computations Against Side-Channel Attacks", University of Windsor Scholarship at UWindsor, Electronic Theses and Dissertations, Jan. 1, 2013, pp. 1-85. 100 Pages.

Kiltz, Eike et al., "Leakage-Resilient ElGamal" dated Aug. 30, 2010, downloaded from http://www.findthatpdf.com/search-116045257-hPDF/download-documents-kilpie10.pdf.htm. 21 pages.

Mamiya, Hideyo et al., "Secure Elliptic Curve Exponentiation against RPA, ZRA, DPA, and SPA", IEICE Trans. Fundamentals, vol. E89-A, No. 8, Aug. 2006, pp. 2207-2215. 9 pages.

Notification Concerning Transmittal of International Preliminary Report on Patentability dated Apr. 13, 2017 re: Int'l Appln. No. PCT/US15/052325. 10 Pages.

Notification of Transmittal of the International Search Report and the Written Opinion of the International Searching Authority dated Dec. 22, 2015 re Int'l Appln. No. PCT/US2015/052325. 15 Pages.

Smith, E. et al., "SCA Countermeasures for ECC over Binary Fields on a VLIW DSP Core", 2003 Tech Report downloaded from http://cacr.uwaterloo.ca/techreports/2003/cacr2003-06.pdf, pp. 1-14. 14 pages.

Sun, Da-Zhi et al., "An Efficient Modular Exponentiation Algorithm against Simple Power Analysis Attacks", IEEE Transactions on Consumer Electronics, vol. 53, No. 4, pp. 1718-1723, Nov. 2007. 6 pages.

Tunstall, Michael et al., "Coordinate Blinding over Large Prime Fields", Cryptographic Hardware and Embedded Systems, CHES 2010, vol. 6225 of Lecture Notes in Computer Science, pp. 443-455, Springer, 2010. 13 pages.

Tunstall, Michael, "Random Order m-ary Exponentiation", Proceedings of the 14th Australasian Conference on Information Security and Privacy, ACISP 2009, Jul. 1-3, 2009, pp. 437-451. 15 pages.

TW Office Action dated Aug. 8, 2019 re: TW Appln. No. 104132617. 13 Pages. (W/Translation).

\* cited by examiner

EXPONENT SPLITTING FOR CRYPTOGRAPHIC OPERATIONS

RELATED APPLICATION

This application is a continuation of U.S. patent application Ser. No. 15/516,662 filed on Apr. 3, 2017, which is the US National Stage Entry of PCT Patent Application PCT/US15/052325 filed on Sep. 25, 2015, which claims the benefit under 35 U.S.C. § 119(e) of U.S. Provisional Application 62/059,477 filed on Oct. 3, 2014, each of which is hereby incorporated by reference.

BRIEF DESCRIPTION OF THE DRAWINGS

The present disclosure will be understood more fully from the detailed description given below and from the accompanying drawings of various implementations of the disclosure.

DETAILED DESCRIPTION

Figure 1:
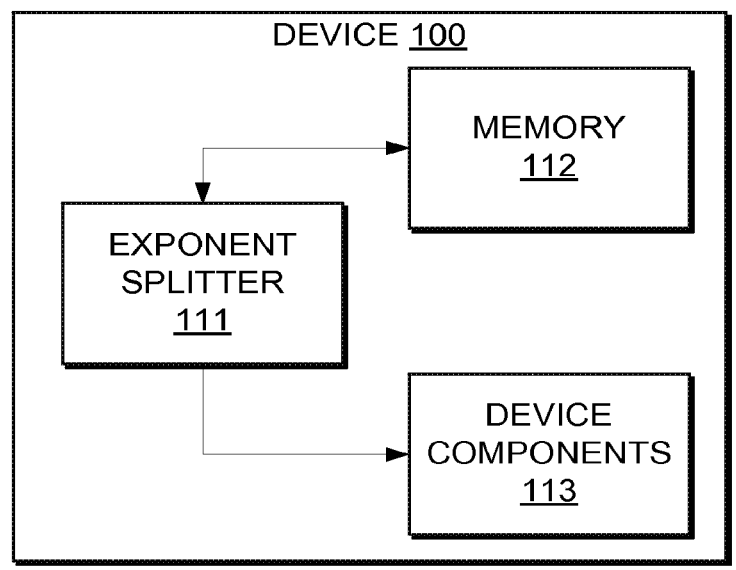
FIG. 1 illustrates an example device including an exponent splitter in accordance with some embodiments.

Aspects of the present disclosure are directed to exponent splitting for cryptographic operations. A value of an exponent may be used in a cryptographic operation that uses an exponentiation method to encode a message based on the value of an exponent. For example, plaintext (e.g., information that a sender wishes to transmit to a receiver) may be encoded based on the value of an exponent to generate a ciphertext (e.g., the encrypted information). As an example, the ciphertext (e.g., y) may be equal to the plaintext (e.g., x) raised to the power of the value of the exponent k (e.g., $y=x^k$).

Accordingly, the exponent value may be used to encode the plaintext and the inverse of the exponent value may be used to decode the plaintext. For example, a sender may transmit the ciphertext (e.g., y) to a receiver and the receiver may decode the ciphertext to retrieve the plaintext by using the inverse of the exponent value (e.g., $x=y^{-k}$). Thus, the exponent value may be considered a key (e.g., a public key) that is used to encode plaintext and the inverse of the exponent value may be considered a key (e.g., a private key) that is used to decode ciphertext.

The exponent value may be generated by an integrated circuit and used by the integrated circuit to perform a cryptographic operation. The generation and use of the exponent value by the integrated circuit may result in susceptibility of the integrated circuit to a side channel attack where an attacker may obtain the exponent value. An example of a side channel attack includes, but is not limited to, Differential Power Analysis (DPA) where an attacker who seeks to obtain the exponent value from the integrated circuit may study the power consumption of the integrated circuit as the exponent value is generated to be used in a cryptographic operation. An attacker may be an unauthorized entity that may obtain the exponent value from the integrated circuit by analyzing power consumption measurements of the integrated circuit over a period of time as the exponent value is generated and/or used in cryptographic operations. Accordingly, when the sender transmits ciphertext to a receiver, the attacker may be able to decode the ciphertext to retrieve the plaintext by using DPA of the integrated circuit to obtain the exponent value.

The exponent value may be generated and/or used to prevent a DPA attack from being able to retrieve the exponent value. For example, the calculation of the exponent value may include random calculations to effectively hide the exponent value that is used by an integrated circuit. For example, the exponent value may be split into two values (referred to as shares) that are at least partly randomly represented. The combined effect of the two shares may be equivalent to the desired exponent value. The use of the two shares that correspond to the exponent value may be referred to as exponent splitting. The exponent value may be used in a group exponentiation.

In some embodiments, the integrated circuit may include a first register to store a first value and a second register to store a second value. The first value and the second value may be updated based on particular bits of a desired exponent value. The first value of the first register and the second value of the second register may be updated for each bit of the first share and the second share until the least significant bit of the shares is reached. The result of the exponentiation method may be stored in the first register or in the second register based on the value of the least significant bit of one of the shares. Furthermore, a first equation may be used to update the first value of the first register and a second equation may be used to update the second value of the second register. Observing some side channel of the integrated circuit used to implement the first and second equations that are used to update the first and second values of the first and second registers may not result in a DPA attacker obtaining the value of the exponent as one of the registers may include the result of a group exponentiation using the exponent value and the other register includes a value that has resulted from additional computations that is associated with additional power consumption. Accordingly, a DPA attacker would not be able to retrieve the exponent value.

FIG. 1 illustrates an example device including an exponent splitter. In general, the device 100 may include an integrated circuit that is associated with an exponent splitter 111, a memory 112, and various device components 113. The exponent splitter 111 of the integrated circuit may generate an exponent value for use in a cryptographic operation.

As shown in FIG. 1, the device 100 may include an exponent splitter 111. In some embodiments, the exponent splitter 111 may use a first share and a second share that correspond to an exponent value and may update the memory 112 based on the first share and the second share (e.g., where the first share and the second share are random bitwise representations). The exclusive-or (XOR) of the first share and the second share may result in the exponent value. In some embodiments, the memory 112 may include multiple registers. The values of the registers may be updated based on different equations or formulas that are based on the first share and the second share. Furthermore, the exponent splitter 111 may select one of the registers from the memory 112 where the value of the selected register contains the result of a group exponentiation using an exponent value. The device components 113 may subsequently utilize the result of the group exponentiation using the exponent value in a cryptographic operation. Examples of such cryptographic operations include, but are not limited to, generating a signature for a message where the message may be used to allow access to particular functionality of the device 100 or to allow the device 100 to perform a particular operation. Examples of the functionality or operations associated with a device include, but are not limited to, access of certain hardware capabilities of the device, access to debug or diagnostic states of the device, and the writing to a memory associated with the device. Accordingly, in some embodiments, the group exponentiation that is based on the exponent value may be used to generate a signature for a message that may allow access to at least some functionality or operations of the device. A message with a valid signature (e.g., based on the group exponentiation using the exponent value) may allow access to a functionality or operation of the device and a message without a valid signature may not allow access to the functionality or operation of the device.

The sender of a message may be allowed to access the functionality or operations of the device 100 when the message from the sender is accompanied by a valid signature that is generated by a cryptographic operation. Examples of such cryptographic operations include, but are not limited to generating a signature associated with Elliptic Curve Digital Signature Algorithm (ECDSA), Rivest Shamir Adleman (RSA) algorithms, etc. where the signature is used in a public-private key cryptosystem. In some embodiments, a group exponentiation method is used as the means of providing a cryptographic security. In some embodiments, the cryptographic operation may use the exponent value in a group exponentiation to generate a signature. In some embodiments, the group exponentiation may be a modular exponentiation (e.g., an exponentiation performed over the integers modulo a chosen integer) or a group exponentiation based on elliptic curve arithmetic, or any other numerical expression.

Figure 2:
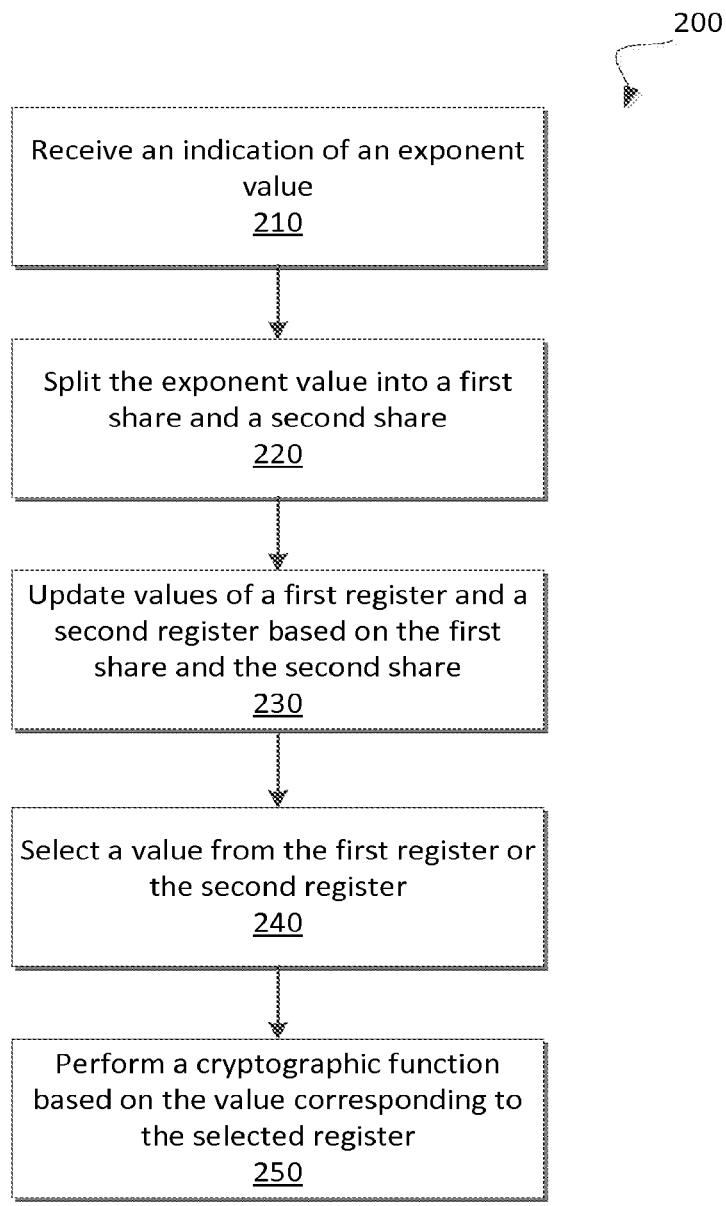
FIG. 2 is a flow diagram of an example method to perform a cryptographic operation based on the splitting of an exponent value in accordance with some embodiments of the present disclosure.

FIG. 2 is a flow diagram of an example method 200 to perform a cryptographic operation based on the splitting of an exponent value. In general, the method 200 may be performed by processing logic that may comprise hardware (e.g., processing device, circuitry, dedicated logic, programmable logic, microcode, hardware of a device, etc.), software (e.g., instructions run or executed on a processing device), or a combination thereof. In some embodiments, the method 200 may be performed by the exponent splitter 111 of FIG. 1.

As shown in FIG. 2, the method 200 may begin with the processing logic receiving an identification of a desired exponent value (block 210). For example, the value of an exponent that is to be used in a group exponentiation of a cryptographic operation may be received. The processing logic may further split the desired exponent value into a first share and a second share (block 220). In some embodiments, each of the first share and the second share may be different values or bitwise representations that correspond to the desired exponent value. For example, the exclusive-or (XOR) of the first share and the second share may result in the desired exponent value. The XOR operation may output a value of true (e.g., '1') when two input bits that correspond to a bit of the first share and a bit of the second share are different (e.g., one bit of the two shares is a '0' and the other bit of the two shares is a '1') and the XOR operation may output a value of false (e.g., '0') when the two input bits that correspond to the bit of the first share and the bit of the second share are the same (e.g., both bits are a '0' or both bits are a '1'). Thus, the combination of the first share and the second share may result in the desired exponent value. Furthermore, although XOR operations are described in the present disclosure, any type of logical or arithmetic operation may be used where the combining of the first share and the second share results in the desired exponent value. For example, an addition operation may be used (e.g., Exponent Value=A+B where A and B are the first and second shares). The processing logic may further update values of a first register and a second register based on the first share and the second share (block 230). For example, the processing logic may update a value of the first register based on a first equation and the value of the second register based on a second equation where the first equation and the second equation are based on values of particular bits of the first and second shares. In some embodiments, one of the first equation and the second equation may include additional calculations that may be used so that power consumption to update the first register and the power consumption to update the second register may not allow the retrieval of the exponent value from a DPA attack. Further details with regard to such equations are described in conjunction with FIG. 4. The processing logic may further select one of the values from the first register or the second register to be used as the exponent value (block 240). For example, a value of the first register or a value of the second register may be selected based on the value of the least significant bit or the most significant bit of the second share as is further described in conjunction with FIG. 4. Furthermore, the processing logic may perform a cryptographic operation based on the value of the selected register (block 250). For example, a signature may be generated where the value of the selected register is a group exponentiation based on the exponent value. In some embodiments, the group exponentiation may correspond to a signature and/or a private key in a cryptographic operation.

Figure 3:
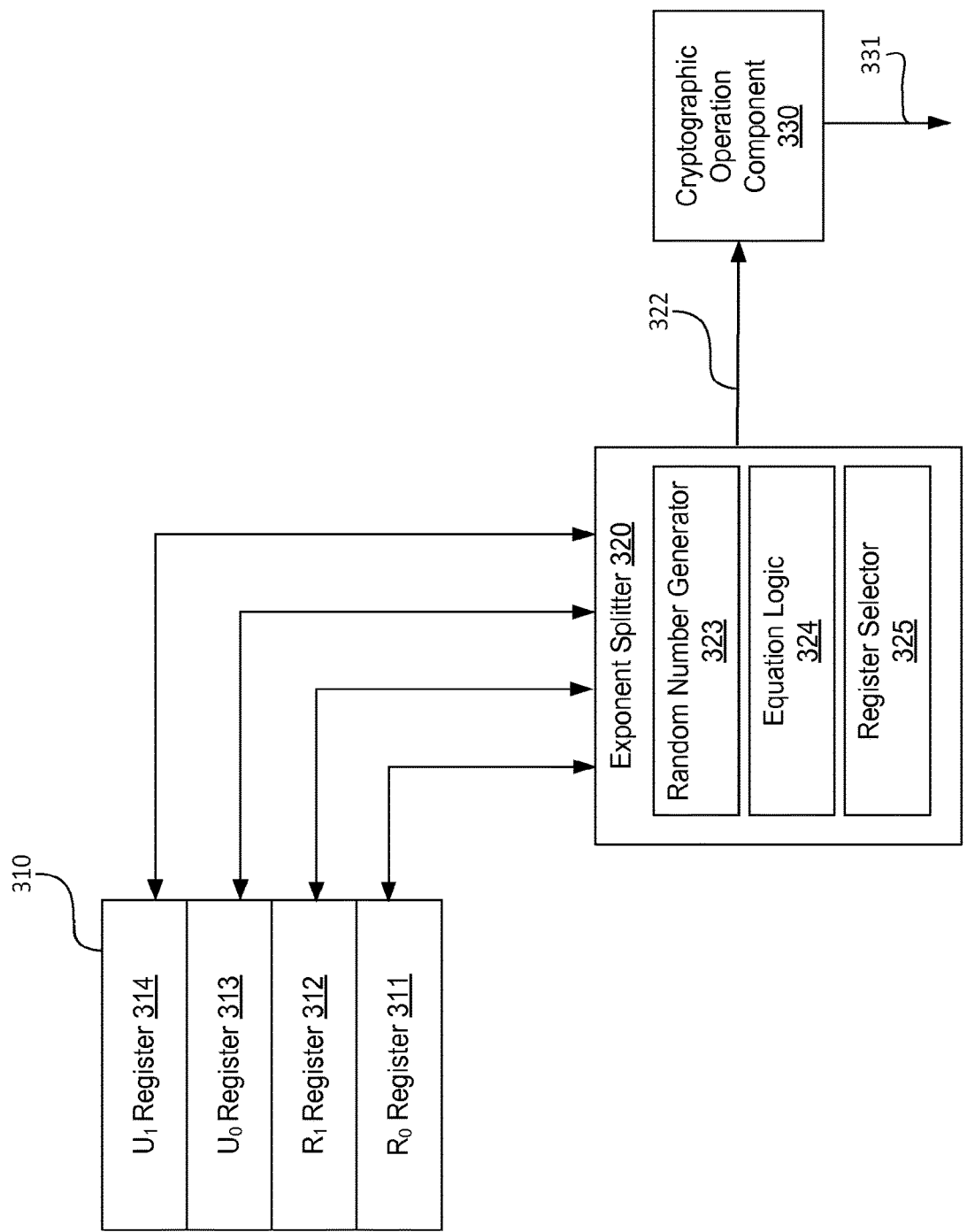
FIG. 3 is a block diagram of an exponent splitter updating values of registers and providing one of the values of the registers for a cryptographic operation in accordance with some embodiments.

FIG. 3 is a block diagram of an exponent splitter 320 updating values of registers and providing one of the values of the registers for a cryptographic operation. In general, the exponent splitter 320 may correspond to the exponent splitter 111 of FIG. 1, the memory 310 may correspond to memory 112 of FIG. 1, and the cryptographic operation component 330 may correspond to the device components 113 of FIG. 1.

As shown in FIG. 3, the exponent splitter 320 may include a random number generator module 323, an equation logic module 324, and a register selection module 325. In alternative embodiments, the functionality of one or more of the modules may be combined or divided. Furthermore, each of the modules may be implemented in hardware (e.g., processing device, circuitry, dedicated logic, programmable logic, microcode, hardware of a device, etc.), software (e.g., instructions run or executed on a processing device), or a combination thereof. The exponent splitter 320 may receive an indication of a desired exponent value that may be split into a first share and a second share.

The random number generator module 323 may generate a random bit at a value of either 0 or 1. In some embodiments, the random number generator module 323 may generate the random number each time that an exponent value is to be generated. The random number may be stored in a memory location of the memory 310 that corresponds to a value that is subsequently updated (e.g., a value corresponding to b' as described in further detail with regard to FIG. 4). Accordingly, the random number that is generated may be the initial value for a register. The equation logic module 324 may include logic or perform logical operations to update values of the first register 311 and the second register 312 of the memory 310 (e.g., The $R_0$ and $R_1$ registers as further described with regard to FIG. 4). In some embodiments, the equation logic module 324 may provide functionality to perform XOR logical operations, arithmetic operations, and/or modular multiplications. The register selector module 325 may select one of the register 311 (e.g., $R_0$) or the register 312 (e.g., $R_1$) and provide the value of the selected register to the cryptographic operation component 330. For example, the register selector module 325 may select the register 311 if the least significant bit of one of the shares is at a value of 0 or the register selection module 325 may select the register 312 if the least significant bit of the share is at a value of 1. In alternative embodiments, the register selector module 325 may select the register 311 if the most significant bit of one of the shares is at a value of 0 or the register 312 may be selected if the most significant bit of the share is at a value of 1. The output signal 322 may include the value of the selected register and may correspond to the result of a group exponentiation based on the desired exponent value.

As shown in FIG. 3, the cryptographic operation component 330 may receive the group exponentiation that is based on the desired exponent value that is stored in one of the registers 311 or 312 and may perform a cryptographic operation based on the group exponentiation. For example, the cryptographic operation component 330 may generate a signature or a private key by using group exponentiation based on the exponent value. The signature or private key may be included in the output signal 331.

The memory 310 may include registers 311, 312, 313, and 314. The registers 311 (e.g., $R_0$) and 312 (e.g., $R_1$) may be updated by the equation logic module 324 of the exponent splitter 320. Furthermore, the registers 313 and 314 (e.g., $U_0$ and $U_1$) may be used to store elements of a mathematical group and their inverses that are used in the group exponentiation (e.g., a group of integers, modulo, etc.). In some embodiments, the registers 311 and 312 may initially store the elements of the mathematical group that is also stored in the register 313. For example, the registers 311, 312, and 313 may store the elements of the mathematical group and the register 314 may store the inverse of the elements of the mathematical group. Further details with regard to the registers are described in conjunction with FIG. 4.

Figure 4:
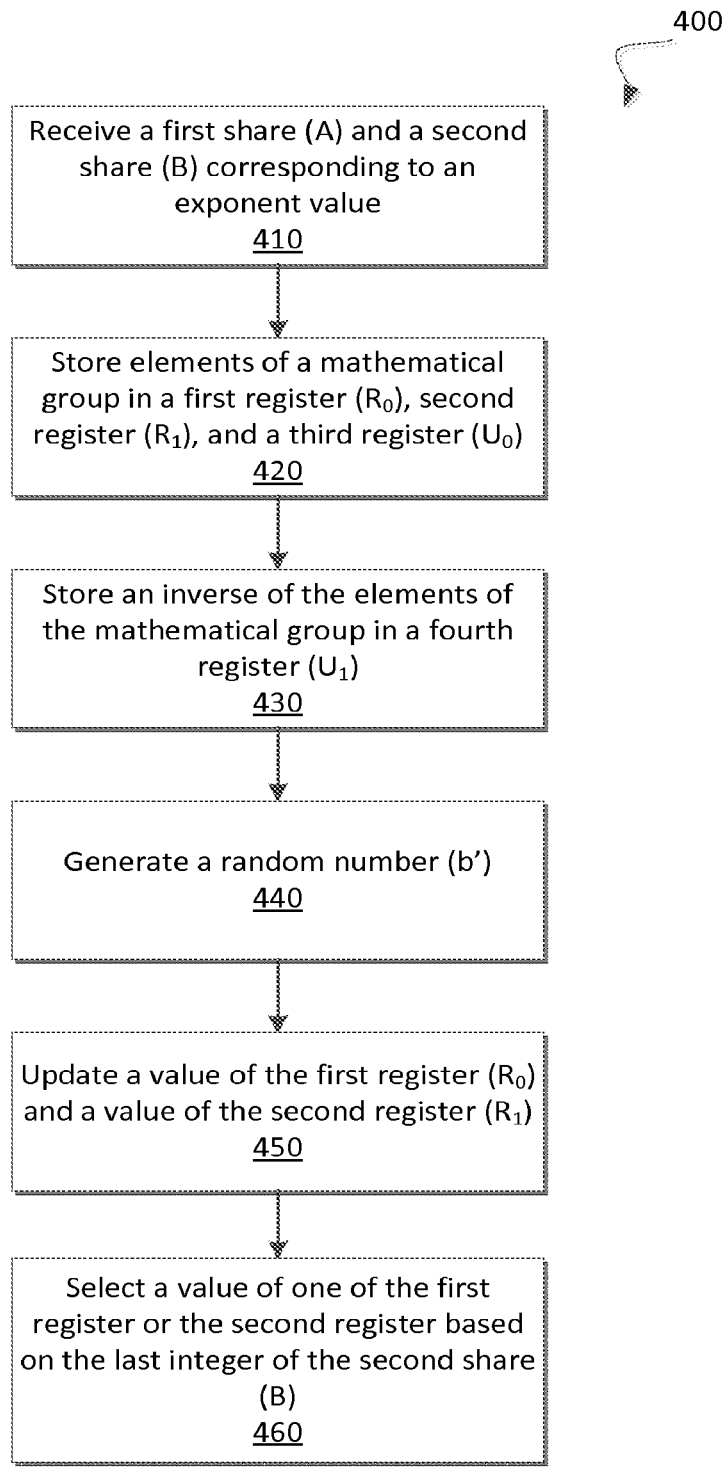
FIG. 4 is a flow diagram of an example method to select a value of one of multiple registers to be used as an exponent value in a group exponentiation corresponding to a cryptographic operation in accordance with some embodiments.

FIG. 4 is a flow diagram of an example method 400 to select a value of one of multiple registers to be used as an exponent value in a group exponentiation corresponding to a cryptographic operation. In general, the method 400 may be performed by processing logic that may comprise hardware (e.g., processing device, circuitry, dedicated logic, programmable logic, microcode, hardware of a device, etc.), software (e.g., instructions run or executed on a processing device), or a combination thereof. In some embodiments, the method 400 may be performed by the exponent splitter 111 of FIG. 1 or the exponent splitter 320 of FIG. 3.

The method 400 may be referred to as a Blinded Montgomery Ladder and may use two shares (e.g., a first share and a second share) in which a combination of the first share and the second share results in a desired exponent value that is to be used in group exponentiation for a cryptographic operation. For example, the XOR of the first share and the second share may be equal to the desired exponent value.

The method 400 may further require two group operations per bit of the desired exponent value. In some embodiments, portions of the group operations may include randomized mathematical operations such that power consumption corresponding to a first group operation (e.g., a first equation to update a value of a first register) and a second group operation (e.g., a second equation to update a value of a second register) may not result in the generation of the exponent value being susceptible to a DPA attack by the observation of the power consumption from the two group operations.

In some embodiments, the method 400 may perform the following method where x represents a group (e.g., a set of integers, modulo, etc.), $A=(a_{n-1}, a_{n-2}, \ldots a_0)_2$ and $B=(b_{n-1}, b_{n-2}, \ldots b_0)_2$ $R_0 \leftarrow x$ ; $R_1 \leftarrow x$;
$U_0 \leftarrow x$ ; $U^1 \leftarrow x^{-1}$;

$b' \xleftarrow{R} \{0, 1\}$;

for i = n -1 down to 0 do
   $R_0 \leftarrow R_{bi \oplus b'} \cdot R_{(bi \oplus b') \oplus ai}$;
   $R_1 \leftarrow R_0 \cdot U_{bi}$;
   $b' = b_i$;
end
return $R_{b0}$
where $R_{b0}$ contains the result of the group exponentiation, $x^{A \oplus B}$.

In some embodiments, x may represent elements of a mathematical group (e.g., the group of integers or modulus used in a group exponentiation), A may be a first share that includes bits $a_{n-1}$ to $a_0$ and B may be a second share that includes bits $b_{n-1}$ to $b_0$. Accordingly, both the first share and the second share may include n bits. Furthermore, $R_0$ may correspond to a first register and $R_1$ may correspond to a second register. Additionally, $U_0$ may correspond to a third register and $U_1$ may correspond to a fourth register. In some embodiments, b' may be a random bit of either 0 or 1 at the initial portion of the method and may subsequently be updated with a value of a bit of the second share for each of the n bits. Furthermore, as shown above, the first share and the second share may each include a number of bits (e.g., n bits) that correspond to a number of bits of the desired exponent value. For each bit of each of the first and second shares, the $R_0$ and $R_1$ register values may be updated based on the first and second equations. For example, the $R_0$ equation may be based on XOR and multiplication operations (e.g., modular multiplication) using the current value of the current bit of the second share (e.g., at an index value of n) and the value of the previous bit of the second share (e.g., at an index value of n+1). Furthermore, the $R_1$ equation may be based on the value stored in the $R_0$ register and the value stored in one of the U registers that is selected based on the value of the current bit of the second share (e.g., $U_0$ is selected if the value of the current bit of the second share is a 0 and $U_1$ is selected if the value of the current bit of the second share is a 1). Furthermore, the b' value may be updated to the value of the current bit of the second share (e.g., $b_i$). In some embodiments, the mathematical operation (i.e., the dot operation) used in the R0 and R1 equations may be a group operation such as an elliptic curve arithmetic operation or any other group operation. Once the final bit of the first and second shares is reached (e.g., the least or most significant bit), the value of one of the registers may be selected based on the value of the least significant bit of the second share (e.g., $b_0$).

Referring to FIG. 4, the method 400 to perform the above described method may begin by processing logic receiving a first share (e.g., A) and a second share (e.g., B) corresponding to an exponent value (block 410). For example, the XOR of the first share and the second share may result in the exponent value that is desired for a cryptographic operation. In some embodiments, the first share may be equal to an XOR operation between a first value (e.g., $k_1$) and a random number (e.g., r) and the second share may be equal to an XOR operation between a second value (e.g., $k_2$) and the random number (e.g., r). In the same or alternative embodiments, the values $k_1$ and $k_2$ may be stored in an integrated circuit of a device (e.g., in memory) and the random number may be determined when the exponent value is to be generated. The processing logic may further store a value of elements of a mathematical group (e.g., integers, modulus, or other mathematical units) in a first register (e.g., $R_0$), second register (e.g., $R_1$), and a third register (e.g., $U_0$) (block 420). Furthermore, the inverse of the elements of the same group may be stored in a fourth register (e.g., $U_1$) (block 430). The processing logic may further generate a random number (e.g., b') (block 440). For example, the processing logic may generate a random 0 or a 1 and assign the random 0 or 1 to another register. The processing logic may further update a value of the first register ($R_0$) and a value of the second register ($R_1$) (block 450). In some embodiments, the value of the first register may be based on the above described equation and the value of the second register may be based on the additional described equation. In some embodiments, the values of the registers may be updated based on a particular bit of the first and second shares. Furthermore, as further described with regard to FIG. 5, the values of the first and second registers may be continuously updated from the first bit (e.g., the most significant bit) until the last bit (e.g., the least significant bit) of the shares has been processed. Alternatively, the values of the first and second registers may be continuously updated from the least significant bit until the most significant bit of the shares has been processed (e.g., for i=0 up to n–1).

As shown in FIG. 4, the processing logic may further select a value of one of the first register or the second register based on the last bit of the second share (B) (block 460). For example, either the first register is selected or the second register is selected based on the value of $b_0$ that corresponds to the least significant bit of the second share (B). For example, if the value of $b_0$ is a 0, then the first register (e.g., $R_0$) may be selected and if the value of $b_0$ is a 1, then the second register (e.g., $R_1$) may be selected. Alternatively, the first register or the second register may be selected based on the value that corresponds to the most significant bit of the second share (B). For example, if the value of $b_{n-1}$ is a 0, then the first register (e.g., $R_0$) may be selected and if the value of $b_{n-1}$ is a 1, then the second register (e.g., $R_1$) may be selected. The value of the selected register may be used to compute a group operation as part of a group exponentiation corresponding to a cryptographic operation.

Figure 5:
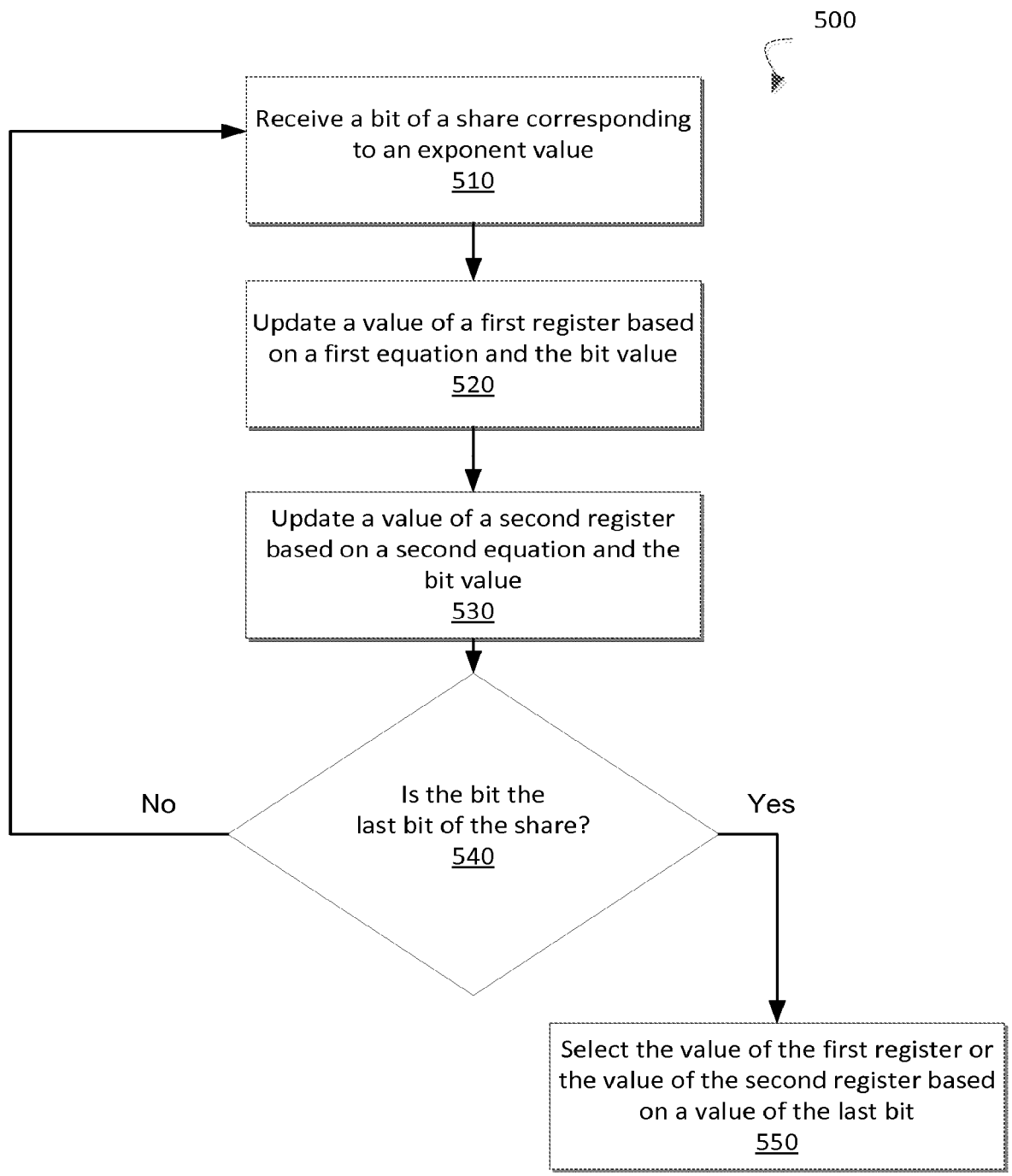
FIG. 5 is a flow diagram of an example method to select a value of a register based on a least significant bit in accordance with some embodiments.

FIG. 5 is a flow diagram of an example method 500 to select a value of a register based on a least significant bit. In general, the method 500 may be performed by processing logic that may comprise hardware (e.g., processing device, circuitry, dedicated logic, programmable logic, microcode, hardware of a device, etc.), software (e.g., instructions run or executed on a processing device), or a combination thereof. In some embodiments, the method 500 may be performed by the exponent splitter 111 of FIG. 1 or the exponent splitter 320 of FIG. 3.

As shown in FIG. 5, the method 500 may begin by the processing logic receiving a bit of a share corresponding to an exponent value (block 510). For example, a first bit at a particular index value (e.g., n) of a first share and a second bit at the same index value of a second share may be received. The value of a first register ($R_0$) may be updated based on a first equation and the bit value of the first and second shares at the index value (block 520). Furthermore, in some embodiments, the value of the first register may further be updated based on a value of a bit at a previous index value (e.g., n+1) of the second share. The processing logic may further update a value of a second register (e.g., $R_1$) based on a second equation that corresponds to a multiplication operation between the value of the first register and the value of another register (e.g., $U_0$ or $U_1$) that is selected based on the value of the bit value of the second share at the current index value (block 530). The processing logic may further determine if the index value of the first and second shares corresponds to the last bit (e.g., the least significant bit or the most significant bit) of the shares (block 540). If the index value of the first and second shares does not correspond to the last bit of the first and second shares, then the processing logic may continue to receive a bit of a share at the next (e.g., n–1 or n+1) index value of the first and second shares. However, if the index value of the first and second shares does correspond to the last bit of the first and second shares (e.g., an index value of 0 so that i=0), then the value of the first register or the value of the second register may be selected based on a value of the last bit of the second share (block 550). For example, if the least significant bit of the second share (e.g., $b_0$) is at a value of 0, then the value of the first register (e.g., $R_0$) may be selected and if the value of the least significant bit of the second share is at a value of 1, then the value of the second register (e.g., $R_1$) may be selected. Alternatively, as previously described, the value of the first register or the value of the second register may instead be selected based on the value of the most significant bit.

In some embodiments, multiple registers may be used and multiple bits of the exponent value may be read at a time. In such an embodiment, the registers may be updated based on the first and second share values. Additionally, the contents of the registers may be modified or updated based on the shares. For example, a first register that stores a value of a first share may be updated based on the second register that stores a value of a second share. Furthermore, the value of one of the registers may be selected as previously described (e.g., after the modifying or updating of the first and second registers). In some embodiments, after one of the registers is selected, the ordering or contents of the registers may be changed so that subsequent shares (e.g., later first and second share values) may be used for a subsequent group operation as part of another group exponentiation corresponding to a cryptographic operation. In the same or alternative embodiments, the contents of the registers may be swapped for the subsequent share values.

Figure 6:
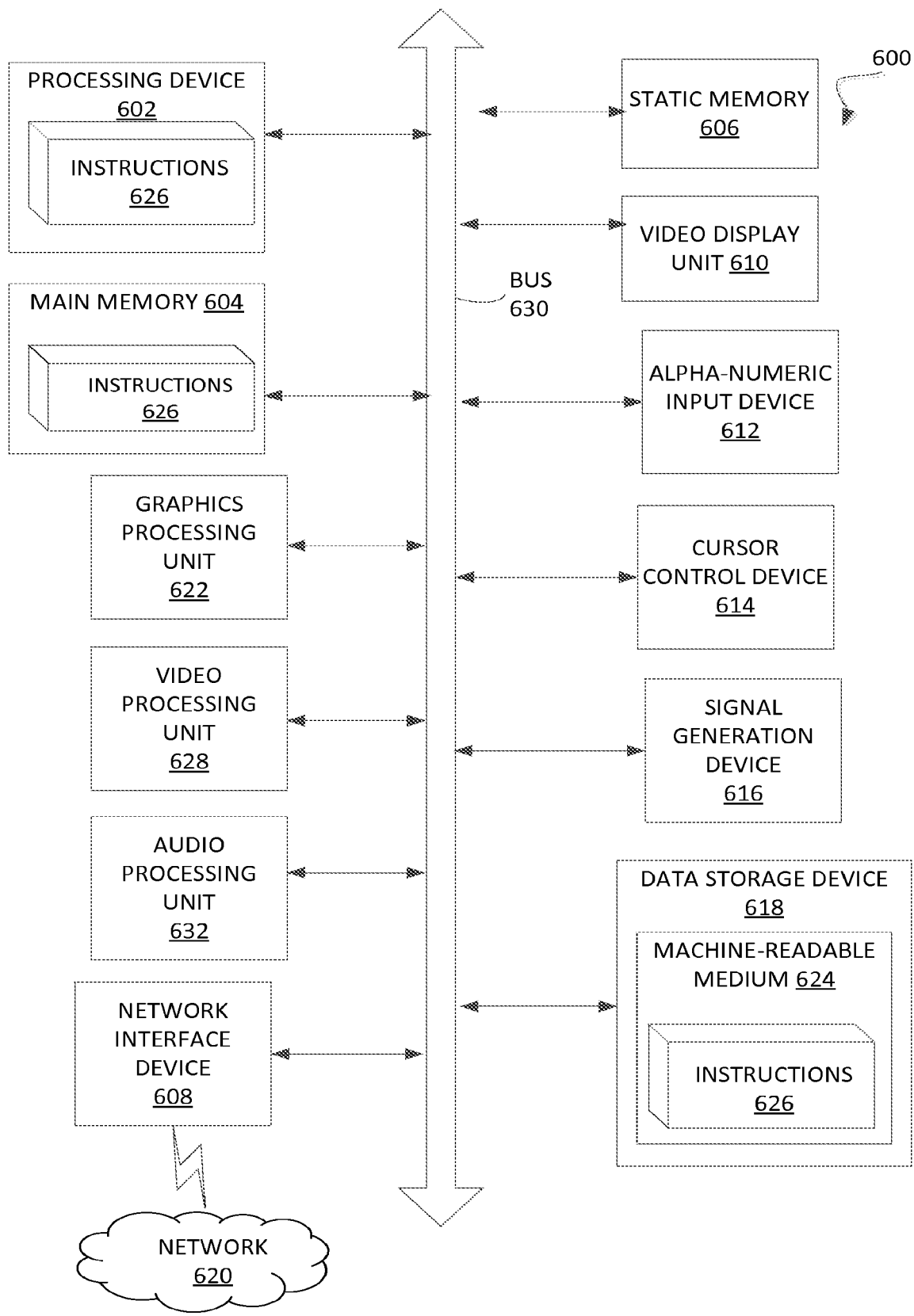
FIG. 6 illustrates a block diagram of an embodiment of a computer system in which some embodiments of the disclosure may operate.

FIG. 6 illustrates an example machine of a computer system 600 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a data storage device 618, which communicate with each other via a bus 630.

Processing device 602 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. The processing device 602 is configured to execute instructions 626 for performing the operations and steps discussed herein.

The computer system 600 may further include a network interface device 608 to communicate over the network 620. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), a graphics processing unit 622, a signal generation device 616 (e.g., a speaker), graphics processing unit 622, video processing unit 628, and audio processing unit 632.

The data storage device 618 may include a machine-readable storage medium 624 (also known as a computer-readable medium) on which is stored one or more sets of instructions or software 626 embodying any one or more of the methodologies or functions described herein. The instructions 626 may also reside, completely or at least partially, within the main memory 604 and/or within the processing device 602 during execution thereof by the computer system 600, the main memory 604 and the processing device 602 also constituting machine-readable storage media.

In one implementation, the instructions 626 include instructions to implement functionality corresponding to an exponent splitter (e.g., exponent splitter 111 of FIG. 1 or exponent splitter 320 of FIG. 3). While the machine-readable storage medium 624 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the method. The structure for a variety of these systems will appear as set forth in the description below. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, implementations of the disclosure have been described with reference to specific example implementations thereof. It will be evident that various modifications may be made thereto without departing from the broader spirit and scope of implementations of the disclosure as set forth in the following claims. The specification and drawings are, accordingly, to be regarded in an illustrative sense rather than a restrictive sense.

What is claimed is:

1. A method comprising:
receiving a first share value and a second share value, wherein a combination of the first share value and the second share value corresponds to a value associated with a cryptographic operation;
updating a first value of a first register by performing a first operation with the first and second share values as inputs to the first operation;
updating a second value of a second register by performing a second operation with the second share value as an input to the second operation;
selecting, by a processing device, one of the first value of the first register or the second value of the second register based on a particular bit of the second share value; and
performing the cryptographic operation with the selected one of the first value of the first register or the second value of the second register.

2. The method of claim 1, wherein the particular bit corresponds to a least significant bit of the second share value.

3. The method of claim 1, wherein the particular bit corresponds to a most significant bit of the second share value.

4. The method of claim 1, wherein the cryptographic operation corresponds to a generation of a signature.

5. The method of claim 1, wherein the value associated with the cryptographic operation corresponds to an exponent value used in the cryptographic operation.

6. The method of claim 1, wherein the first operation and the second operation are each associated with power consumption to reduce susceptibility to a Differential Power Analysis (DPA) attack.

7. The method of claim 1, wherein the first value of the first register is selected to be used in the cryptographic operation responsive to the particular bit value of the second share value being at a first value and the second value of the second register is selected to be used in the cryptographic operation responsive to the particular bit value of the second share value being at a second value that is different than the first value.

8. A system comprising:
a memory; and
a processing device, operatively coupled with the memory, to:
receive a first share value and a second share value, wherein a combination of the first share value and the second share value corresponds to a value associated with a cryptographic operation;
update a first value of a first register by performing a first operation with the first and second share values as inputs to the first operation;
update a second value of a second register by performing a second operation with the second share value as an input to the second operation;
select one of the first value of the first register or the second value of the second register based on a particular bit of the second share value; and
perform the cryptographic operation with the selected one of the first value of the first register or the second value of the second register.

9. The system of claim 8, wherein the particular bit corresponds to a least significant bit of the second share value.

10. The system of claim 8, wherein the particular bit corresponds to a most significant bit of the second share value.

11. The system of claim 8, wherein the cryptographic operation corresponds to a generation of a signature.

12. The system of claim 8, wherein the value associated with the cryptographic operation corresponds to an exponent value used in the cryptographic operation.

13. The system of claim 8, wherein the first operation and the second operation are each associated with power consumption to reduce susceptibility to a Differential Power Analysis (DPA) attack.

14. The system of claim 8, wherein the first value of the first register is selected to be used in the cryptographic operation responsive to the particular bit value of the second share value being at a first value and the second value of the second register is selected to be used in the cryptographic operation responsive to the particular bit value of the second share value being at a second value that is different than the first value.

15. A non-transitory computer readable medium comprising instructions, which when executed by a processing device, cause the processing device to perform operations comprising:
receiving a first share value and a second share value, wherein a combination of the first share value and the second share value corresponds to a value associated with a cryptographic operation;
updating a first value of a first register by performing a first operation with the first and second share values as inputs to the first operation;
updating a second value of a second register by performing a second operation with the second share value as an input to the second operation;
selecting one of the first value of the first register or the second value of the second register based on a particular bit of the second share value; and
performing the cryptographic operation with the selected one of the first value of the first register or the second value of the second register.

16. The non-transitory computer readable medium of claim 15, wherein the particular bit corresponds to a least significant bit of the second share value.

17. The non-transitory computer readable medium of claim 15, wherein the particular bit corresponds to a most significant bit of the second share value.

18. The non-transitory computer readable medium of claim 15, wherein the cryptographic operation corresponds to a generation of a signature.

19. The non-transitory computer readable medium of claim 15, wherein the first value of the first register is selected to be used in the cryptographic operation responsive to the particular bit value of the second share value being at a first value and the second value of the second register is selected to be used in the cryptographic operation responsive to the particular bit value of the second share value being at a second value that is different than the first value.

20. The non-transitory computer readable medium of claim 15, wherein the value associated with the cryptographic operation corresponds to an exponent value used in the cryptographic operation.

\* \* \* \* \*